3,641,004
ALKYL ESTERS OF 6-(BENZENESULFONYL)-TRIHALO-2-PICOLINIC ACID

R. Garth Pews and Fred P. Corson, Midland, Mich., assignors to The Dow Chemical Company, Midland, Mich.
No Drawing. Filed Sept. 18, 1969, Ser. No. 859,185
Int. Cl. A61k 27/00; C07d 31/48
U.S. Cl. 260—239.8                  7 Claims

ABSTRACT OF THE DISCLOSURE

Disclosed are alkyl esters of 6-(benzenesulfonyl)-trihalo-2-picolinic acid and their preparation. These compounds are useful as pesticides.

SUMMARY OF THE INVENTION

The present invention is directed to alkyl esters of 6-(benzenesulfonyl)-trihalo-2-picolinic acid corresponding to the formula

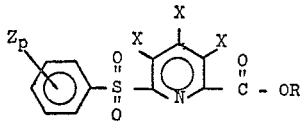

In this and succeeding formula, X represents chloro, fluoro, or bromo; Z represents hydrogen, chloro, fluoro, bromo, nitro, or loweralkyl of 1 to 4 carbon atoms, inclusive; p represents an integer of 0 to 3, inclusive and R represents loweralkyl of 1 to 4 carbon atoms, inclusive.

The expression "loweralkyl" is employed in the present specification and claims to designate a straight or branched chain alkyl radical containing from 1 to 5 carbon atoms, inclusive, such as, for example, methyl, ethyl, isopropyl, propyl, 1,1-dimethyl propyl, tert-butyl and n-butyl.

The alkyl esters of the present invention are crystalline solids which are of low solubility in water and of moderate solubility in many common organic solvents. These compounds are suitable for use as pesticides in the control of various pests such as fungi and bacteria.

The compounds of the present invention are prepared by the reaction of as aromatic sulfonyl cyanide with 5,5-dialkoxy-1,2,3,4 - tetrahalocyclopentadiene. The reaction can be carried out in the presence of an inert organic solvent if desired. This reaction can be represented as follows:

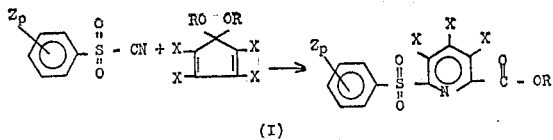

(I)

wherein Z, p, X and R are as hereinbefore defined.

The reaction consumes the reactants in a ratio of one mole of the aromatic sulfonyl cyanide per mole of the 5,5-dialkoxy-1,2,3,4 - tetrahalocyclopentadiene and the employment of such proportions is preferred.

The reaction proceeds under ambient pressure at temperatures of from about 50° to about 250° C. The two reactants are intimately contacted together; and if desired, the contacting can be carried out in the presence of an inert organic solvent such as, for example, dichlorobenzene, xylene, nitrobenzene or benzonitrile.

The reactants are usually mixed at ambient temperatures and brought to a temperature of between about 27° to about 200° C. and held there under reflux until the reaction is complete. Depending upon the rate of reaction, the reaction mixture may be refluxed for a period of time up to about 50 hours. The reaction time depends on the reactants and temperature employed and is usually between about 5 to 50 hours. After the reaction is complete, the reaction mixture is cooled and the solvent removed by evaporation under reduced pressure. The product is recovered by recrystallization of the residue from a solvent such as, for example, ethyl acetate, hexane, methylene chloride or a methylene chloride-hexane mixture.

DESCRIPTION OF SOME PREFERRED EMBODIMENTS

The following examples illustrate the present invention and the manner by which it can be practiced but, as such, should not be construed as limitations upon the overall scope of the same.

Example 1.—Methyl 6-(4'-toluenesulfonyl)-3,4,5-trichloropicolinate

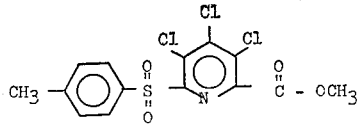

To a 100 milliliter flask is added 26.4 grams (0.1 mole) of 5,5-dimethoxy-1,2,3,4 - tetrachlorocyclopentadiene and 18.1 grams (0.1 mole) of p-toluenesulfonyl cyanide. The mixture is placed under agitation and brought to a temperature of 150° C. and so maintained for 20 hours. The reaction mixture is cooled and dissolved in 30 milliliters of ethyl acetate. This mixture is added with agitation to 100 milliliters of cold hexane. A precipitate product of methyl 6-(4'-toluenesulfonyl)-3,4,5 - trichloropicolinate forms and is collected by filtration and dried. The product is recovered in a yield of 29.6 grams (76 percent of theoretical) and has a melting point of 105°–106.5° C. The product is found by analysis to have carbon, hydrogen, nitrogen and chlorine contents of 42.6, 2.57, 3.5 and 26.8 percent, respectively, as compared to the theoretical contents of 42.5, 2.53, 3.6 and 27.0 percent, respectively, calculated for the named structure.

Example 2.—Methyl 6-(4'-chlorobenzenesulfonyl)-3,4,5-tribromopicolinate

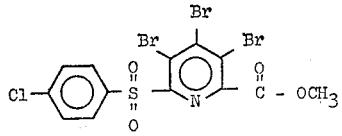

To a 100 milliliter flask is added 21.6 grams (0.05 mole) of 5,5-dimethoxy - 1,2,3,4 - tetrabromocyclopentadiene, 9.7 grams (0.05 mole) of p-chlorobenzenesulfonyl cyanide and 15 milliliters of o-dichlorobenzene. This mixture is maintained under agitation for 15 hours at a temperature of 165° C. The reaction mixture is cooled and added with agitation to 200 milliliters of cold hexane. A light brown solid inate product of methyl 6 - (4' - chlorobenzenesulfonyl) - 3,4,5 - tribromopicolinate precipitates and is recovered by filtration and dried. The product is recovered in a yield of 19.6 grams (74.1 percent of theoretical) and has a melting point of 131°–132.5° C. The product is found by analysis to have carbon, hydrogen, nitrogen, bromine and chlorine contents of 28.8, 1.4, 2.7, 44.5 and 6.2 percent, respectively, as compared to the theoretical contents of 28.5, 1.3, 2.6, 43.8 and 6.2 percent, respectively, calculated for the named structure.

The following compounds of the present invention are prepared in accordance with the methods herein set forth (M.P. and M.W. designate melting point and molecular weight, respectively).

Methyl 6 - (4'-chlorobenzenesulfonyl)-3,4,5-trichloropicolinate (M.P. 107°–109° C.) from the reaction of 5,5-dimethoxy-1,2,3,4-tetrachlorocyclopentadiene and p-chlorobenzenesulfonyl cyanide.

Ethyl 6 - (4'-chlorobenzenesulfonyl)-3,4,5-trichloropicolinate (M.W. 379.1) from the reaction of 5,5-diethoxy-1,2,3,4-tetrachlorocyclopentadiene and p-chlorobenzenesulfonll cyanide.

Ethyl 6-(4'-toluenesulfonyl)-3,4,5 - trichloropicolinate (M.W. 402.6) from the reaction of 5,5-diethoxy-1,2,3,4-tetrachlorocyclopentadiene and p-toluenesulfonyl cyanide.

Methyl 6-(4'-nitrobenzenesulfonyl)-3,4,5-trichloropicolinate (M.P. 135°–137° C.) from the reaction of 5,5-dimethoxy-1,2,3,4-tetrachlorocyclopentadiene and p-nitrobenzenesulfonyl cyanide.

Methyl 6-(2'-chlorobenzenesulfonyl)-3,4,5 - trichloropicolinate (M.W. 415) from the reaction of 5,5-dimethoxy-1,2,3,4-tetrachlorocyclopentadiene and 2-chlorobenzenesulfonyl cyanide.

Methyl 6-(2',4'-dichlorobenzenesulfonyl)-3,4,5-trichloropicolinate (M.W. 449.5) from the reaction of 5,5-dimethoxy-1,2,3,4-tetrachlorocyclopentadiene and 2,4-dichlorobenzenesulfonyl cyanide.

Propyl -6-(2',4',6'-trinitrobenzenesulfonyl) - 3,4,5 - trichloropicolinate (M.W. 533.6) from the reaction of 5,5-dipropoxy-1,2,3,4-tetrachlorocyclopentadiene and 2,4,6-trinitrobenzenesulfonyl cyanide.

Butyl 6-(benzenesulfonyl) - 3,4,5 - trichloropicolinate (M.W. 425.59) from the reaction of 5,5-dibutoxy-1,2,3,4-tetrachlorocyclopentadiene and benzenesulfonyl cyanide.

Butyl 6-(4'-bromobenzenesulfonyl)-3,4,5 - tribromopicolinate (M.W. 634.7) from the reaction of 5,5-dibutoxy-1,2,3,4-tetrabromocyclopentadiene and p-bromobenzenesulfonyl cyanide.

Propyl 6-(4'-fluorobenzenesulfonyl)-3,4,5-trifluoropicolinate (M.W. 377.1) from the reaction of 5,5-dipropoxy-1,2,3,4-tetrafluorocyclopentadiene and p-fluorobenzenesulfonyl cyanide.

Methyl 6-(4'-nitrobenzenesulfonyl)-3,4,5-tribromopicolinate (M.P. 173°–175° C.) from the reaction of 5,5-dimethoxy-1,2,3,4-tetrabromocyclopentadiene and p-nitrobenzenesulfonyl cyanide.

Methyl 6-(4'-butylbenzenesulfonyl)-3,4,5-trifluoropicolinate (M.W. 387.2) from the reaction of 5,5-dimethoxy-1,2,3,4-tetrafluorocyclopentadiene and p-butylbenzenesulfonyl cyanide.

Methyl 6-(4'-toluenesulfonyl)-3,4,5-tribromopicolinate (M.P. 127°–129° C.) from the reaction of 5,5-dimethoxy-1,2,3,4-tetrabromocyclopentadiene and p-toluenesulfonyl cyanide in o-dichlorobenzene.

Ethyl 6 - (4'-ethylbenzenesulfonyl)-3,4,5-trichloropicolinate (M.W. 422.6) from the reaction of 5,5-diethoxy-1,2,3,4-tetrachlorocyclopentadiene and p-ethylbenzenesulfonyl cyanide.

In accordance with the present invention, it has been discovered that the alkyl esters of 6-(benzenesulfonyl) trihalo-2-picolinic acid compounds can be employed as pesticides for the control of many bacterial and fungal pests. They can be applied to or can be included in plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, wood or growth medium. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates; the toxicants can be present in a concentration of from 5 to 98 percent by weight. It is also often convenient to apply the compounds as wettable powders.

In a representative operation, each of the compounds methyl 6-(4'-chlorobenzenesulfonyl)-3,4,5-tribromopicolinate, methyl 6-(4'-toluenesulfonyl)-3,4,5-trichloropicolinate, methyl 6-(4'-nitrobenzenesulfonyl)-3,4,5-tribromopicolinate and methyl 6-(4'-nitrobenzenesulfonyl)-3,4,5-trichloropicolinate when employed as the sole toxicant in a nutrient agar at a concentration of about 500 parts by weight of the compound per million parts of agar is found to give 100 percent kill and control of the organism Trichophyton mentagrophytes.

In another representative operation, employing the same nutrient agar and toxicant concentration, each of the compounds methyl 6-(4'-toluenesulfonyl)-3,4,5-trichloropicolinate and methyl 6-(4'-nitrobenzenesulfonyl)-3,4,5-trichloropicolinate are found to give 100 percent kill and control of the organisms Mycobacterium phlei and Staphylococcus aureus.

In an additional operation employing the same toxicant concentration and nutrient agar, methyl 6-(4'-nitrobenzenesulfonyl)-3,4,5-trichloropicolinate gives 100 percent kill and control of Bacillus subtilis, Candida pelliculosa, Ceratocystis I.P.S. and Cephaloascus fragans.

PREPARATION OF STARTING MATERIALS

The 5,5-dialkoxy-1,2,3,4-tetrahalocyclopentadiene compounds employed as starting materials are prepared by the reaction of a hexahalocyclopentadiene with the corresponding alkali alkoxide in the presence of the alcohol from which the alkoxide is derived.

The aromatic sulfonyl cyanides employed as starting materials are prepared by the reaction of the corresponding sodium aromatic sulfinate with cyanogen chloride at a temperature in the range of about 0° to about 50° C.

What is claimed is:
1. The compound corresponding to the formula

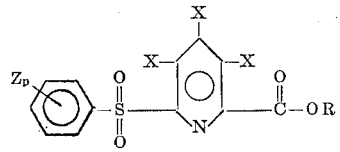

wherein X represents chloro, fluoro or bromo; Z represents hydrogen, chloro, fluoro, bromo, nitro or lower-alkyl of 1 to 4 carbon atoms, inclusive; p represents an integer of 0 to 3, inclusive and R represents loweralkyl of 1 to 4 carbon atoms, inclusive.

2. The compound of claim 1 which is methyl 6-(4-toluenesulfonyl)-3,4,5-trichloropicolinate.

3. The compound of claim 1 which is methyl 6-(4'-chlorobenzenesulfonyl)-3,4,5-trichloropicolinate.

4. The compound of claim 1 which is methyl 6-(4'-nitrobenzenesulfonyl)-3,4,5 trichloropicolinate.

5. The compound of claim 1 which is methyl 6-(4'-chlorobenzenesulfonyl)-3,4,5-tribromopicolinate.

6. The compound of claim 1 which is methyl 6-(4'-toluenesulfonyl)-3,4,5-tribromopicolinate.

7. The compound of claim 1 which is methyl 6-(4'-nitrobenzenesulfonyl)-3,4,5-tribromopicolinate.

No references cited.

HENRY R. JILES, Primary Examiner

C. M. SHURKO, Assistant Examiner

U.S. Cl. X.R.

106—15, 20, 111; 117—138.5, 147, 154; 252—47.5, 106, 107, 121; 260—294.8 F, 611 R; 424—75, 229, 266

PO-1050
(5/69)

UNITED STATES PATENT OFFICE
CERTIFICATE OF CORRECTION

Patent No. __3,641,004__      Dated __8 February 1972__

Inventor(s) __Garth Pews and Fred P. Corson__

It is certified that error appears in the above-identified patent and that said Letters Patent are hereby corrected as shown below:

Column 4, line 31, insert --methyl 6-(4'-chlorobenzenesulfonyl)-
-3,4,5-trichloropicolinate,-- between "-linate," and "methyl".

Signed and sealed this 1st day of August 1972.

(SEAL)
Attest:

EDWARD M. FLETCHER, JR.      ROBERT GOTTSCHALK
Attesting Officer      Commissioner of Patents